United States Patent [19]

Kersten et al.

[11] 4,134,388
[45] Jan. 16, 1979

[54] SOLAR COLLECTOR COMPRISING A U-SHAPED ABSORBER

[75] Inventors: Reinhard Kersten, Aachen-Kornelimünster; Egbert Kuhl, Aachen, both of Fed. Rep. of Germany

[73] Assignee: U.S. Philips Corporation, New York, N.Y.

[21] Appl. No.: 689,945

[22] Filed: May 25, 1976

[30] Foreign Application Priority Data

May 30, 1975 [DE] Fed. Rep. of Germany ....... 2523965

[51] Int. Cl.² .................................................. F24J 3/02
[52] U.S. Cl. ..................................... 126/270; 126/271
[58] Field of Search ................ 126/270, 271; 138/113, 138/108; 237/1 A

[56] References Cited

U.S. PATENT DOCUMENTS

| | | | |
|---|---|---|---|
| 2,475,544 | 6/1949 | Del Cueto | 126/270 |
| 2,688,922 | 9/1954 | Bonaventura et al. | 60/641 X |
| 2,994,318 | 8/1961 | Lee | 126/270 |
| 3,227,153 | 1/1966 | Godel et al. | 126/271 |
| 3,250,297 | 5/1966 | Mooneyham | 138/113 |
| 3,952,724 | 4/1976 | Pei | 138/113 |
| 3,974,822 | 8/1976 | Patil | 126/271 |
| 3,987,782 | 10/1976 | Meier, Jr. | 126/271 |

*Primary Examiner*—William F. O'Dea
*Assistant Examiner*—Larry Jones
*Attorney, Agent, or Firm*—Frank R. Trifari; Rolf E. Schneider

[57] ABSTRACT

A solar collector comprising a U-shaped absorber sealed in an evacuated cover tube provided with a semi-cylindrical reflector on its inner surface, the U-shaped absorber being arranged between the cover tube axis and the reflector, with the central plane of the U-shaped absorber including the center lines of its legs and coinciding with the symmetry plane of the reflector.

4 Claims, 5 Drawing Figures

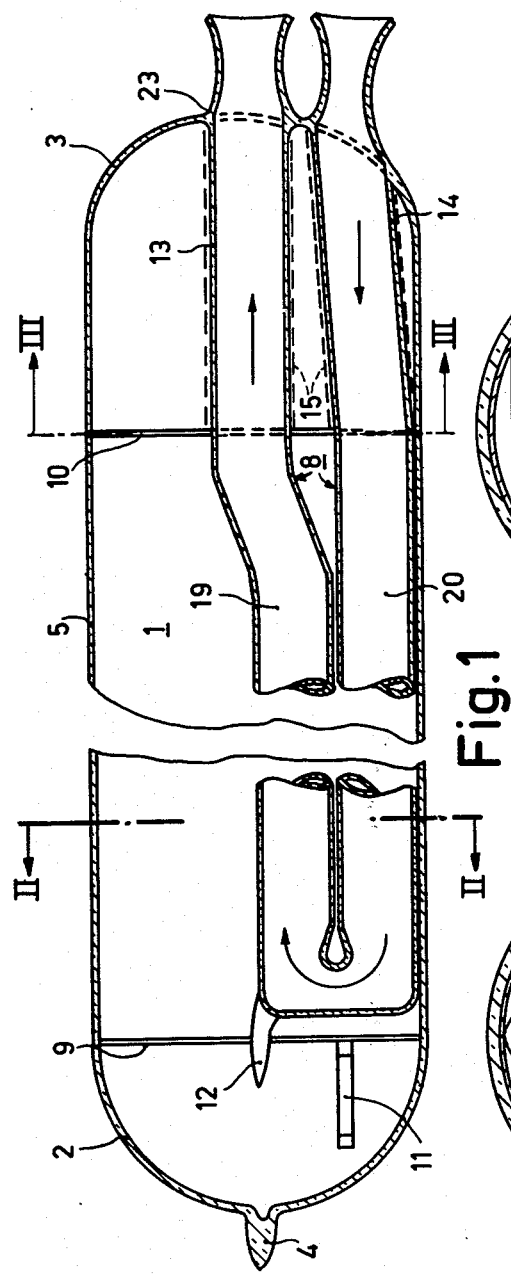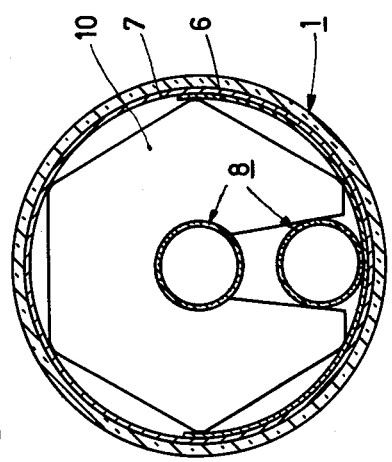

SOLAR COLLECTOR COMPRISING A U-SHAPED ABSORBER

This invention relates to a solar collector comprising a tubular U-shaped absorber for transferring heat from incident solar radiation to a heat transport medium, the said absorber being enclosed in a vacuumtight manner in a sealed, evacuated, transparent cover tube, the said cover tube having a cylindrical portion which is provided on the inner side with a reflector extending, in a cross-sectional view, over an angle of at least 180°.

Solar collectors serve to convert the major part of solar radiaton into heat and to exchange this heat with a heat transport medium, for example, water, with a level of efficiency as high as possible. In order to achieve a high level of efficiency, solar collectors should have the following properties, if possible:
  (a) good absorption (absorption factor $a >$ or $= 0.9$ over the whole solar spectrum ($\lambda = 0.3$ to 2 microns).
  (b) low emission (emission factor $\epsilon \leqq 0.3$) in the range of the heat radiation ($\lambda = .3$ to 30 microns).
  (c) low heat losses due to heat conduction and convection.
  (d) low thermal capacity.

U.S. Pat. No. 3,227,153, describes solar collector comprising a U-shaped absorber which is arranged so that the central plane which passes through the axes of the legs of the U-shaped tube extends perpendicularly to the symmetry plane of the inner reflector. The rear of such an absorber is not exposed to sunlight, so that it makes virtually no contribution to heat production. Therefore, an absorber of this kind must have a large surface area in order to achieve a given temperature for a transport medium.

The invention has for its object to provide a solar collector having an absorber which is as small as possible and which offers optimum use of solar energy. In accordance with the invention the solar collector is characterized in that the central plane extending through the centre lines of the legs of the U-shaped absorber is arranged in the symmetry plane of the reflector between the cover tube's longitudinal axis and the said reflector.

In this arrangement the complete absorber is exposed to sunlight, so that substantially half the absorber volume suffices in comparison with the known solar collector.

Preferably, the cover tube is made of glass and the inner reflector is made of silver or aluminium. If the U-shaped absorber is also made of glass, preferably externally blackened glass, the absorber and the cover tube can be simply joined by melting on one end, to form one vacuumtight unit. The absorber tubes preferably have a circular cross-section.

The heat losses of a solar collector can be reduced by taking the following steps:
  (a) providing the cylindrical portion of the cover tube on the inner side with an infrared-reflecting layer. Suitable infrared-reflecting layers are made of tin oxide, but are preferably of indium oxide.
  (b) providing the U-shaped absorber with a blackened surface layer in the cylindrical region of the cover tube, the said layer consisting, for example, of a selective absorber material such as nickel oxide or copper oxide or copper sulphide, or consisting of a non-selective black glass enamel in combination with an infrared-reflecting layer.

The cylindrical region of the cover tube is to be understood to mean herein the circle-cylindrical portion which is adjoined by the cap-like ends of the sealed cover tube.

In a preferred embodiment of the solar collector in accordance with the invention flat terminal reflectors are arranged in the cover tube at the ends of the cylindrical portion, the said terminal reflectors extending perpendicularly to the longitudinal axis of the cover tube and holding the absorber.

They can be made of thin aluminium sheet naterial or of mica provided with an aluminium or silver layer of vapour deposition. These flat inner reflectors serve for reflecting heat radiation from the cover tube. If these reflectors were not provided, heat radiation would be absorbed by the thermally black tube end caps which are difficult to provide with an infrared-reflecting layer for technical reasons, and this would cause heat losses.

The leg portions of the U-shaped absorber which are situated between the joint of the said absorber and the cover tube and the nearest terminal reflector are preferably provided with a layer having a low thermal emission factor. This layer can be made, for example, of baking gold. Reliable joints can thus be made, because the absorber tube portion provided with such a layer can more readily maintain the required melting temperature due to lower dissipation of heat. Moreover, the losses of the heat transport medium in these tube portions are also reduced.

The present solar collector is particularly suitable for use in a flat collector system comprising a plurality of solar collectors which are arranged parallel to each other in a horizontal position, the reflector symmetry planes of the individual solar collectors being arranged perpendicularly to the collector system surface and the heat transport medium in operation successively flowing through the individual solar collectors.

In accordance with the invention the free end of the leg of the U-shaped absorber which is located near the longitudinal axis of the cover tube is bent towards the said axis in the central plane of the absorber, and the free end of the leg of the U-shaped absorber which is remote from the said axis is bent away from the central plane of the absorber.

Firstly, the required distance between the absorber tube passages through the cover tube for perfect fusion is thus obtained. Secondly, no residue of the transport medium, for example, water, remains in the absorber when it is drained; this is important for protection against frost.

In accordance with the invention the solar collector system comprising solar collectors of the type as described hereinbefore is characterized in that the sides of the individual cover tubes including the reflectors are accomodated in a heat insulating material which extends about the ends of the cover tubes and which is provided with reflective layers in planes which are prolongations of the flat terminal reflectors.

The heat insulating material thus also acts as a cabinet-like accommodation for the individual solar collectors.

The thermal insulation of the cover contributes to a higher efficiency of the solar collectors, whilst the fact that the insulation in the prolongation of the flat terminal reflectors is reflective ensures that, in the case of oblique incidence of solar radiation the radiation which is lost on one side by the shadow of the overhanging insulation is reflected on the other side onto the absorber.

A preferred embodiment of the device in accordance with the invention will be described in detail hereinafter with reference to the drawings, in which:

FIG. 1 is a longitudinal sectional view of a solar collector in accordance with the invention.

FIGS. 2 and 3 are cross-sectional views of the solar collector of FIG. 1 taken along the lines II—II and III—III, respectively, the wall thickness of the cover tube as well as the thickness of the layers provided on the inner side of this tube being shown in exaggerated form for the sake of clarity.

Figure 4:
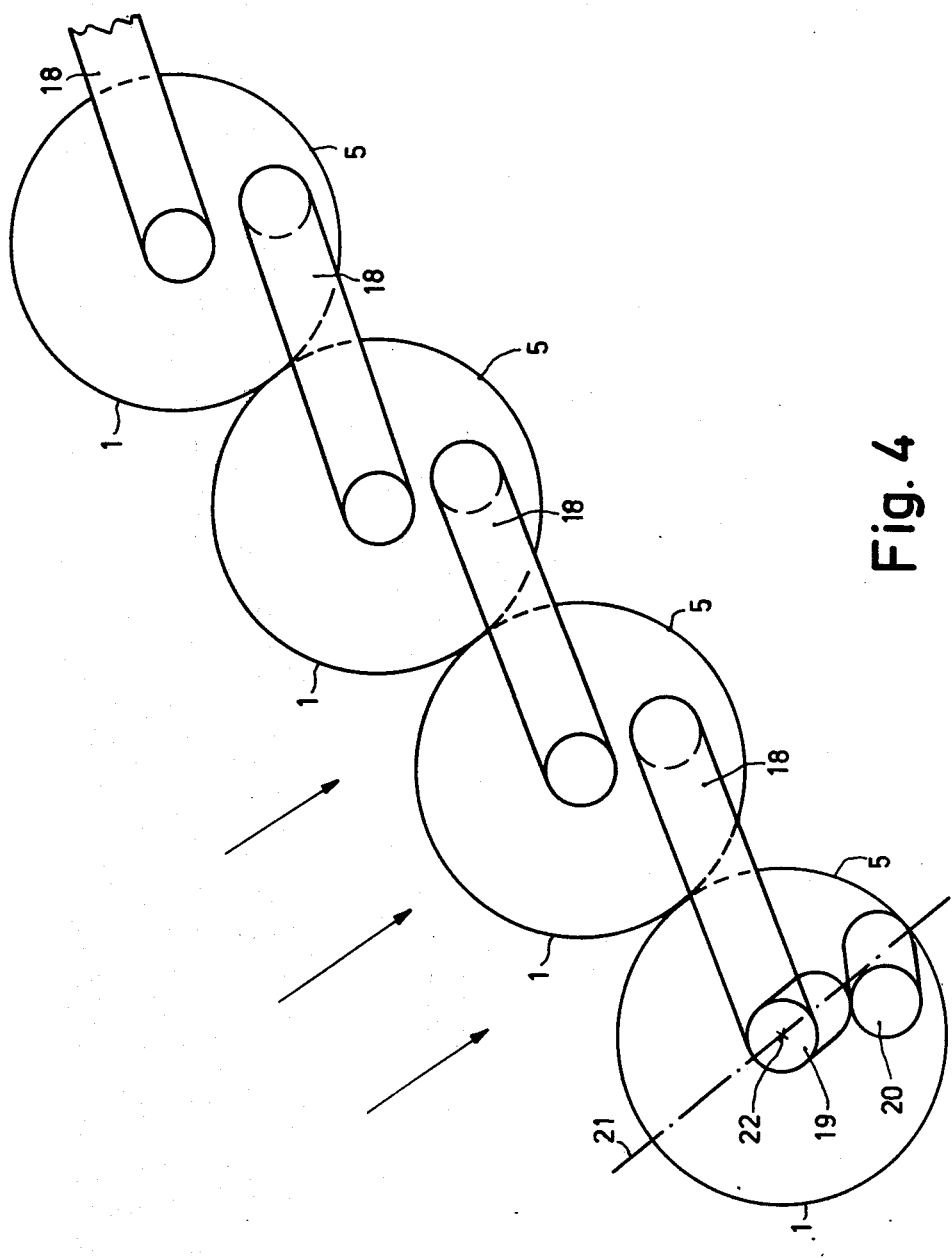
FIG. 4 shows a plurality of solar collectors in accordance with the invention which are staggered and combined to form a flat collector system.

The solar collector shown in FIGS. 1 to 3 comprises a transparent glass cover tube 1 having a cylindrical portion 5 which is closed on both ends where dome-shaped tube end caps 2 and 3 are formed. The tube end cap 2 comprises a sealed pumping stem 4 wherethrough the interior of the cover tube 1 has been evacuated to a residual gas pressure of less than 1 mbar. Across its entire cylindrical length the cover tube 1 is provided, over a cross-sectional area of at least 180°, with an inner reflector 6 of vapour-deposited silver. Furthermore, the inner side of the cover tube 1 is provided with an infra-red-reflecting layer 7 of $In_2O_3$ in the cylindrical region 5.

In the cover tube 1 a tubular glass absorber 8 is sealed in a vacuumtight manner at the area 23, the said absorber being U-shaped and serving to accommodate a heat transport medium, for example, water, to be heated by solar radiation. The central plane 21, extending through the axes of the legs of the U-tube is arranged in the symmetry plane of the inner reflector 6 between the cover tube axis 22 and the inner reflector 6; in the cylindrical region 5 of the cover tube 1, the U-shaped absorber is provided with a black surface layer, for example, of black glass enamel.

The absorber 8 is retained in the cover tube 1 by means of two flat terminal reflectors 9 and 10 which extend, at the ends of the cylindrical region 5 of the cover tube 1, perpendicularly to the tube axis 22 and which are made of mica provided with a layer of aluminum by vapour deposition. The terminal reflector 9 also supports a getter ring 11. The absorber 8 is provided on the rear with a glass projection 12 which engages the terminal reflector 9 in a supporting manner.

The absorber tube leg portions 13 and 14 situated between the terminal reflector 10 and the joint 23 of the absorber 8 and the cover tube 1 are provided with a baking gold layer 15 on their outer side.

FIG. 4 shows a flat collector system comprising a plurality of solar collectors, as shown in FIGS. 1 to 3, which are arranged horizontally and parallel one adjacent the other. The inner reflector symmetry planes of the individual solar collectors are parallel to each other, but perpendicular to the collector system surface. The normal of the collector system surface is in operation oriented in the direction of the mean maximum solar radiation. A heat transport medium, for example, water, then successively flows through the individual solar collectors which are interconnected by means of connection tubes 18. The free end of the leg 19 of the absorber tube is bent towards the cover tube axis 22 in the absorber central plane 21, whilst the free end of the leg 20 of the absorber tube is bent out of the absorber central plane 21 in the horizontal. It is thus achieved that when the transport medium, for example, water, is discharged, no water residues remain in the absorber 8.

Figure 5:
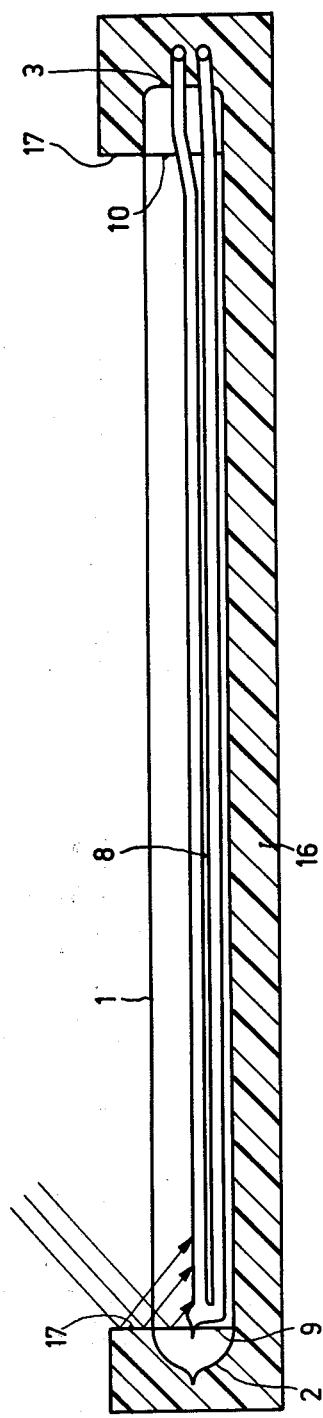
FIG. 5 is a side elevation of a collector system as shown in FIG. 4, provided with thermal insulation.

The reflective lower side of the cover tube 1 of the solar collector forming a part of the system as shown in FIG. 5 is accommodated in a heat insulating material 16 which extends about the non-reflective ends 2 and 3 of the cover tube 1. In the prolongation of the terminal reflectors 9 and 10, the heat insulating material 16 is provided with a reflective layer 17 of sheet aluminium. These mirrors 17 serve to reflect the incident solar radiation onto the absorber 8.

In a practical embodiment of a flat solar collector system as shown in FIG. 5, comprising 18 solar collectors, the outer diameters of the cover tubes 1 amounted to 75 mm, the wall thickness was 1.2 mm, the overall length was 105 cm and the length of the cylindrical portion 5 between the terminal reflectors 9 and 10 was 98 cm. The infrared-reflecting layer 7 was made of indium oxide and had a thickness of 0.3 micron. The absorber 8 consisted of a glass tube having an outer diameter of 15 mm and a wall thickness of 1 mm. The absorber surface consisted of black glass enamel having a thickness of 0.2 mm, an absorption factor $\alpha = 0.96$ and an emission factor $\epsilon = 0.9$.

In such a system at an ambient temperature of 293 K (20° C.), water can be heated to its boiling point of 373 K (100° C.) when as little as 200 W/m² solar radiation is incident.

What is claimed is:

1. A solar collector which comprises a sealed, evacuated, transparent cover tube having a cylindrical portion circular in cross-section and provided on its inner surface with a reflector extending, in a cross-sectional view, over an angle of at least 180°, and a U-shaped tubular absorber for transferring heat from incident solar radiation to a heat transport medium, said U-shaped tubular absorber being enclosed in a vacuum-tight manner in said cover tube and being positioned between the cover tube axis and the reflector, and the central plane of the U-shaped tubular absorber including the centre lines of its legs and coinciding with the symmetry plane of the reflector.

2. A solar collector according to claim 1, in which the absorber leg located near the axis of the cover tube has a free end portion bent towards said axis in the central plane of the absorber, and the absorber leg remote from said axis has a free end portion bent away from the central plane of the absorber.

3. A solar collector according to claim 1, in which flat terminal reflectors are respectively arranged in the cover tube at the ends of its cylindrical portion, said terminal reflectors extending perpendicularly to the axis of the cover tube and supporting the absorber legs.

4. A solar collector according to claim 3, in which the reflective portion of the cover tube is surrounded by a heat-insulating material extending about the ends of the cover tube and provided with reflective surfaces respectively representing planar prolongations of the flat terminal reflectors.

* * * * *